United States Patent [19]

Kando et al.

[11] Patent Number: 4,653,861

[45] Date of Patent: Mar. 31, 1987

[54] LIQUID CRYSTAL DISPLAY DEVICE

[75] Inventors: Yasuhiko Kando; Tamihito Nakagomi; Shinji Hasegawa, all of Mobara, Japan

[73] Assignee: Hitachi, Ltd., Tokyo, Japan

[21] Appl. No.: 644,766

[22] Filed: Aug. 27, 1984

[30] Foreign Application Priority Data

Aug. 31, 1983 [JP] Japan .................................. 58-157801

[51] Int. Cl.⁴ ................................................ G02F 1/13
[52] U.S. Cl. ..................................................... 350/337
[58] Field of Search ......................................... 350/337

[56] References Cited

FOREIGN PATENT DOCUMENTS 122443 10/1978 Japan .................................. 350/337
25751 2/1979 Japan .................................. 350/337
118016 9/1980 Japan .................................. 350/337

OTHER PUBLICATIONS

Journal of Applied Physics, vol. 48, No. 4, Apr. 1977, pp. 1426 to 1431.
Optical Characteristics of Twisted Nematic Liquid Crystals: Application to the Improvement of the Scanning Capability in Matrix Displays.

Primary Examiner—Donald A. Griffin
Attorney, Agent, or Firm—Charles E. Pfund

[57] ABSTRACT

A liquid crystal display device wherein a nematic liquid crystal having a positive dielectric anisotropy and added with a chiral material is sealed between a pair of upper and lower substrates so as to constitute a helical structure twisted within a range between 160° and 200° along a direction of thickness thereof, and polarizing axes or absorption axes of a pair of polarizing plates disposed on the upper and lower substrates are inclined by a predetermined angle with respect to major axes of liquid crystal molecules adjacent to the upper and lower substrates, respectively.

4 Claims, 8 Drawing Figures

LIQUID CRYSTAL DISPLAY DEVICE

BACKGROUND OF THE INVENTION

The present invention relates to a liquid crystal display device and, more particularly, to an improvement in a field effect liquid crystal display device for time-multiplexed driving.

A conventional so-called twisted nematic liquid crystal display device has a 90° twisted helical structure of a nematic liquid crystal having positive dielectric anisotropy and sealed between two substrates having transparent electrodes arranged thereon in desired display patterns. Polarizing plates are arranged on outer surfaces of the substrates such that polarizing axes (or absorption axes) thereof become perpendicular or parallel to the major axes of the liquid crystal molecules adjacent to the substrates.

In order to twist the liquid crystal molecules between the two substrates through 90°, for example, a so-called rubbing method is utilized to rub a surface of a substrate which contacts the liquid crystal molecules by a cloth along one direction. In this case, the major axes of the liquid crystal molecules adjacent to the surface become parallel to this one direction (i.e., a rubbing direction). Two rubbed surfaces are spaced apart so as to oppose each other while their rubbing directions are twisted through 90°. These rubbed substrates are then sealed with a sealing agent, and a nematic liquid crystal having positive dielectric anisotropy is filled in a space formed between the substrates. Therefore, the major axes of the liquid crystal molecules are twisted through 90° between the substrates. The polarizing plates disposed on the resultant liquid crystal cell have polarizing or absorption axes substantially parallel to the liquid crystal modelcules adjacent thereto, respectively. In a conventional reflective type liquid crystral display device which is most frequently used, a reflector is disposed on the outer surface of the lower polarizing plate. Light incident from the upper surface of the device is linearly polarized by the polarizing plate or polarizer. In a portion of a liquid crystal layer which is not applied with a voltage, the plane of polarization of the linearly polarized light is rotated through 90° along the helical structure and is transmitted through the lower polarizing plate or analyzer. The light is then reflected by the reflector and returns to the upper surface of the device. However, in a porton of the liquid crystal layer which is applied with a voltage, when the helical structure is destroyed, the plane of polarization of the linearly polarized light will not be rotated. Therefore, the linearly polarized light transmitted through the upper polarizing plate is blocked by the lower polarizing plate and will not reach the reflector. In this manner, electrical signals can be converted into optical images in accordance with the presence or absence of an electrical potential applied across the liquid crystal layer.

Performance parameters for a quantification of time-multiplexed driving in a subsequent description will be briefly described below.

FIG. 1 is a graph showing typical voltage-luminance characteristics of a conventional reflective type liquid crystal display device. The graph shows the relative luminance of reflected light as a function of the applied voltage. An initial value of luminance is 100%, and the final value (a value at a sufficiently high applied voltage) is 0%. In general, a threshold voltage Vth is given at a 90% relative luminance, and a saturation voltage Vsat is given at a 10% relative luminance so as to determine the liquid crystal characteristics. However, in practice, a pixel is sufficiently bright when the relative luminance is more than 90%, so that the pixel is considered to be in an OFF state. When the relative luminance is less than 50%, the pixel is sufficiently dark, and hence the pixel is considered to be in an ON state. Voltages corresponding to 90% and 50% of relative luminances are given as the threshold voltage Vth and the saturation voltage Vsat, respectively, hereinafter. In other words, the threshold voltage Vth is given as a maximum allowable voltage corresponding to the OFF state, and the saturation voltage Vsat is given as a minimum allowable voltage corresponding to the ON state.

The electrooptical characteristics of the liquid crystal display device change in accordance with a viewing angle. These characteristics limit a viewing angle range within which a good display quality is obtained.

A viewing angle $\phi$ will be described with reference to FIG. 2. Referring to FIG. 2, a rubbing direction of an upper substrate 11 of a liquid crystal display device 1 is represented by reference numeral 2, a rubbing direction of a lower substrate 12 is represented by reference numeral 3, and a twist angle between liquid crystal molecules adjacent to the upper substrate and liquid crystal molecules adjacent to the lower substrate is represented by reference numeral 4. X- and Y-axes are plotted along the surface of the liquid crystal display device 1. The X-axis defines a direction for bisecting the twist angle 4 of the liquid crystal molecules. A Z-axis defines a normal to the X-Y plane. An angle between a viewig direction 5 and the Z-axis is defined as the viewing angle $\phi$. In this case, by way of simplicity, the viewing direction 5 is plotted in the X-Z plane. The viewing angle $\phi$ in FIG. 2 is regarded to be positive. Since contrast becomes high when viewed from a direction within the X-Z plane, this direction is called the viewing direction 5.

Conventional commercially available liquid crystal display devices have viewing angles falling within a range of 10° to 40°. Therefore, referring to FIG. 1, when a voltage corresponding to the 90% luminance at the viewing angle $\phi$ of 10° is represented as a threshold voltage Vth1, the voltage corresponding to the 50% luminance at the same viewig angle is represented as a saturation voltage Vsat1, and a voltage corresponding to the 90% luminance at a viewing angle of 40° is represented by a threshold voltage Vth2, the sharpness of the luminance-voltage characteristic, $\gamma$, the viewing-angle D dependence, $\Delta\phi$, and the time-multiplexability, m, are defined as follows:

$\gamma = Vsat1/Vth1$ $\Delta\phi = Vth2/Vth1$ $m = Vth2/Vsat1$

Assuming luminance-voltage characteristic curves are ideal, the two curves at viewing angles $\phi$ of 10° and 40° do not differ, the curves are steep enough for a threshold voltage and a saturation voltage to have the same value.

The time-multiplexed driving of the conventional liquid crystal display device depends on $\Delta n \cdot d$ where $\Delta n$ is the refractive index anisotropy, i.e., optical anisotropy of the liquid crystal and d is the distance between the upper and lower substrates. When $\Delta n \cdot d$ is large (e.g., more than 0.8 μm), the sharpness of the luminance-voltage characteristic $\gamma$ becomes good (small), and the viewing-angle dependence Δφ is poor (small). However, when Δn·d is small (e.g., less than 0.8 μm), the sharpness of the luminance-voltage characteristic γ becomes poor (large) and the viewing-angle dependence Δφ becomes good (large). However, the time-multiplexability m (=Δφγ) becomes good (large) when Δn·d is decreased. A typical example is summarized in Table 1.

TABLE 1

| Characteristics | Δn · d | |
|---|---|---|
| | 0.5 μm | 1.0 μm |
| γ | 1.150 | 1.084 |
| Δφ | 0.965 | 0.877 |
| m | 0.839 | 0.808 |

Time-multiplexed driving will be briefly described with reference to a dot matrix display. As shown in FIG. 3, Y stripe electrodes (signal electrodes) and X stripe electrodes (scanning electrodes) 14 are formed on the lower and upper substrates 12 and 11, respectively. The liquid crystal portions at intersections of the X and Y electrodes 14 and 13 are chosen to be in an ON state or an OFF state so as to display characters or the like. Referring to FIG. 3, n scanning electrodes X1, X2, ..., Xn are repeatedly scanned in the order named in a time-multiplexed manner. When a given scanning electrode (e.g., X3 in FIG. 3) is selected, a selection or nonselection display signal is simultaneously applied to all pixels P31, P32, ... and P3m on the given scanning electrode through the signal electrode 13 constituted by electrode Y1, Y2, ... and Ym in accordance with a display signal. In other words, the on/off operation of the pixels at the intersections of the scanning electrodes and the signal electrodes is determined by a combination of voltage pulses applied to the scanning and signal electrodes. In this case, the number of scanning electrodes X corresponds to the number of time-multiplexing.

The conventional liquid crystal display device has poor time-multiplexed drive characteristics as shown in Table 1, and these characteristics would permit time-multiplexing of only a maximum of 32 or 64. However, demand has arisen to improve the image quality of the liquid crystal display device and increase the number of data to be displayed. Any conventional liquid crystal display device cannot satisfy these needs.

SUMMARY OF THE INVENTION

It is an object of te present invention to provide a liquid crystal display device having a cell structure entirely different from that of the conventional liquid crystral display device, thereby providig excellent time-multiplexed drive characteristics and hence excellent image quality even if the number of time-multiplexing is more than 32.

In order to achieve the above object of the present invention, there is provided a liquid crystal display device, wherein a twist angle of a helical structure of liquid crystal molecules falls within the range between 160° and 200°, a pair of polarizing plates are arranged before and after the helical structure of the liquid crystal modecules in such a manner that absorption axes (or polarizing axes) of the polarizing plates are inclined by a predetermined angle with respect to liquid crystal molecules adjacent to the substrates.

DESCRIPTION OF THE PREFERRED EMBODIMENTS

Preferred embodiments of the present invention will be described with reference to the accompanying drawings.

Figure 1:
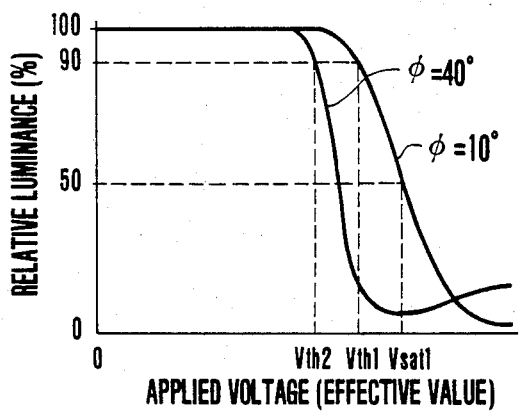
FIG. 1 is a graph showing the luminance-voltage characteristics of a conventional liquid crystal display device used in defining time-multiplexed characteristics.
Figure 2:
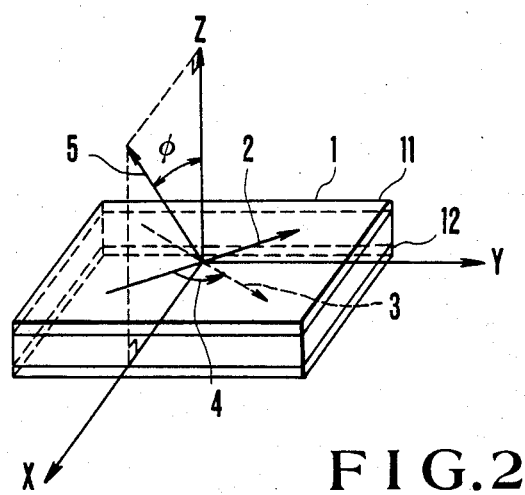
FIG. 2 is a perspective view of the liquid crystal display device for explaining the measuring direction of the time-multiplexed drive characteristics.
Figure 3:
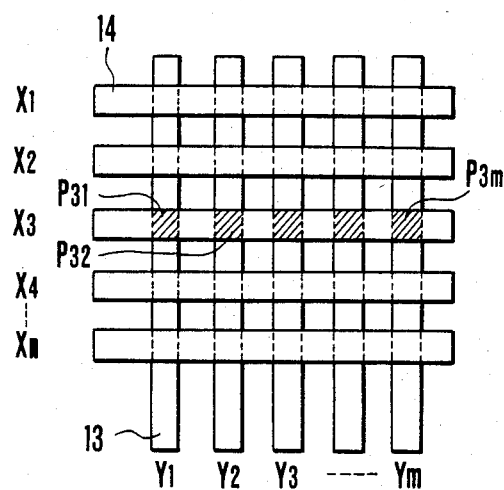
FIG. 3 is a representation for explaining time-multiplexed driving.
Figure 4:
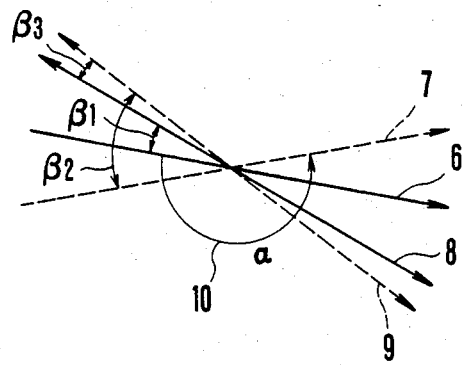
FIGS. 4, 5 and 6 are representations for explaining the relationship between the aligning direction of liquid crystal molecules, the twist direction, and the axes of polarizers of a liquid crystal display device according to an embodiment of the present invention, respectively.
Figure 5:
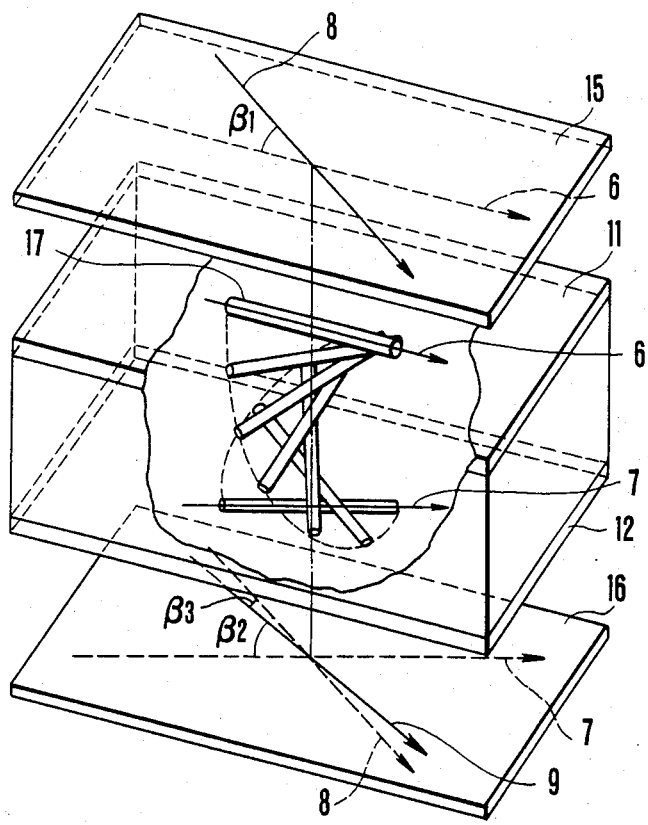

FIG. 4 shows the relationship between the direction (e.g., a rubbing direction) of major axes of the liquid crystal molecules, a twist angle thereof, and absorption axes (or polarizing axes) of the polarizers of a liquid crystal display device according to an embodiment of the present invention when the liquid crystal display device is viewed from the upper direction. FIG. 5 is a perspective view showing this relationship. The same reference numberals as in FIG. 4 denote the same parts as in FIG. 2.

A twist direction 10 (indicated by a curved arrow) and a twist angle α of liquid crystal molecules 17 are defined by a rubbing direction 6 of an upper substrate 11, a rubbing direction 7 of a lower substrate 12, and the type and an amount of a chiral material added to a nematic liquid crystal. In particular, the twist direction is determined by the type of chiral material. The twist angle is determined by the rubbing directions 6 and 7 of the upper and lower electrodes 11 and 12. The stability of orientation of the liquid crystal molecules is determined by a specific pitch of the chiral material, an amount thereof, and a thickness of the liquid crystal layer.

A maximum value of the twist angle α is limited to 200° because light scattering tends to occur when the liquid crystal display device is in an ON state at or near the threshold voltage. The lower limit of the twist angle is detemined by contrast and the time-multiplexed drive characteristics and is given to be 160°.

An angle β3 between an absorption axis (or a polarizing axis) of a polarizing plate 15 and an absorption axis (or polarizing axis) of a polarizing plate 16 preferably falls within the range between 0° and 30° when contrast, brightness, color and the like are considered. An angle β1 (a narrower included angle) between the absorption axis 8 (or a polarizing axis) of the upper polarizing plate 15 and the rubbing direction 6 of the upper substrate 11, and an angle β2 (a narrower inclued angle) between an absorption axis 9 (or a polarizing axis) of the lower polarizing plate 16 and the rubbing direcion 7 of the lower substrate 12 respectively fall within the range between 30° and 60° when contrast, brightness, color and the like are considered.

When the optical anisotropy of the liquid crystal and the thickness (μm) of the liquid crystal layer are given to be Δn and d, respectively, the liquid crystal display device according to the present invention greatly depends on Δn·d, i.e., an optical path difference. When the optical path difference satisfies condition 0.8 μm ≦ Δn·d ≦ 1.2 μm in consideration of contrast, brightness, colors and the like, satisfactory results are obtained. The optical anisotropy Δn generally depends on wavelengths. The optical anisotropy is increased when the wavelength is short, while it is decreased when the wavelength becomes long. The optical anisotropy Δn value in this specification is measured by using an He-Ne laser beam of a wavelength of 6,328 Å at a temperature of 25° C. When the optical anisotropy is measured at another wavelength, it may be slightly different from that measured in the present invention.

The construction and the measured results of the liquid crystal display device according to an embodiment of the present invention will be described hereinafter.

Figure 6:
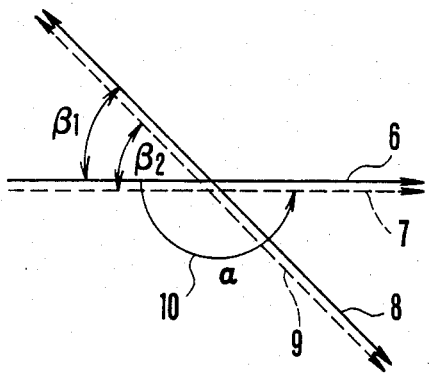

FIG. 6 shows the relationship betwen the rubbing direction of the substrate, the twist direction and angle of the helical structure of the liquid crystal molecules, and the polarizing axes (or absorption axes) of the polarizers when the liquid crystal display device is viewed from the upper direction.

A liquid crystal used in this device comprises a nematic liquid crystal. This nematic liquid crystal contains as major constituents a total amount of 79% of a biphenyl liquid crystal and ester cyclohexane (ECH) liquid crystal. The nematic liquid crystal further contains as an additive 0.5% by weight of a chiral material S811

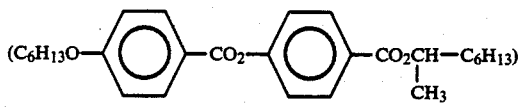

available from Merk. The optical anisotropy Δn of this nematic liquid crystal is 0.123, and the compound thereof is given in Table A.

TABLE A

| Component | Content (% by weight) |
|---|---|
| C₄H₉—(H)—CO₂—(○)—OC₂H₅ | 21 |
| C₃H₇—(H)—CO₂—(○)—OC₂H₅ | 21 |
| C₅H₁₁—(H)—CO₂—(○)—OCH₃ | 21 |
| C₂H₅—(○)—(○)—CH | 8 |
| C₄H₉—(○)—(○)—CH | 8 |

TABLE A-continued

| Component | Content (% by weight) |
|---|---|
| C₂H₅—(○)—CO₂—(○)—CN | 7.5 |
| C₃H₇—(○)—(○)—CO₂—(○)—(H)—C₃H₇ (F) | 7 |
| C₃H₇—(○)—(○)—CO₂—(○)—(H)—C₅H₁₁ | 6 |
| S811 | 0.5 |

Referring to FIG. 6, the rubbing directions 6 and 7 of the upper and lower substrates 11 and 12, respectively are parallel to each other. The twist direction 10 and the twist angle X of 180° are determined by the chiral material S811.

An absorption axis 8 of the upper polarizing plate 15 is parallel to an absorption axis 9 of the lower polarizing plate 16 (i.e., β3=0°), and the angle β1 between the absorption axis 8 and the rubbing direction 6 and the angle β2 between the absorption axis 9 and the rubbing direction 7 are respectively 45°.

Figure 7:
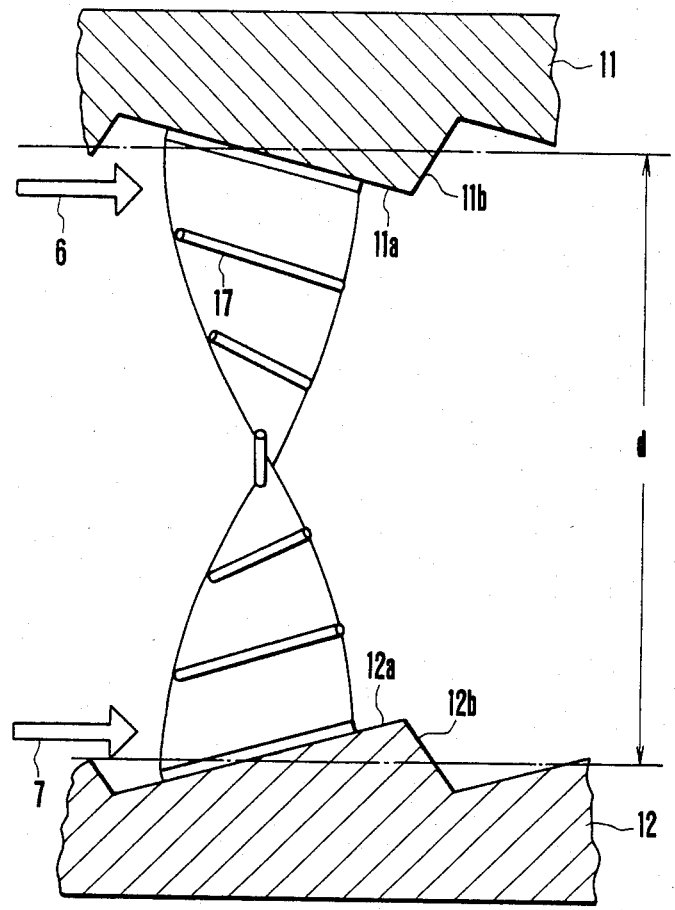
FIG. 7 is a representation for expalining the relationship between the rubbing direction and the major axes of the liquid crystal modecules.

The relationship between the rubbing direction 6 of the upper substrate 11, the rubbing direction 7 of the lower substrate 12 and the helical structure of the liquid crystal molecules 17 is described with reference to FIGS. 6 and 7. When the substrates are rubbed, small slopes 11a and 11b (or 12a and 12b) having different inclination directions are repeatedly cyclically formed along the rubbing direction, as shown in FIG. 7. In order to align the liquid crystal molecules to be substantially parallel to each other between the substrates, the rubbing directions of the upper and lower substrates must be substantially aligned with each other, as shown in FIG. 7, so as to obtain good image quality.

A number of liquid crystal devices with various values of thickness d of liquid crystal layers resulting in various values of optical path difference Δn·d have been constructed for testing displayed colors and brightness. Test results are shown in Table 2.

It was found that the parity of colors and brightness of the liquid crystal display device were best and satisfactory when the optical path difference Δn d was about 1 μm. In addition, it was also found that no problem occurred in practice when the optical path difference Δn d fell within the range from 0.7 μm to 1.2 μm, preferably 0.90 to 1.10 μm when the relationship shown in FIG. 6 was established.

TABLE 2

| Δn · d (μm) | Brightness | Color |
|---|---|---|
| 0.50 | dark | yellow to reddish brown |
| 0.63 | dark | blue to purple |
| 0.76 | dark | light blue |
| 0.85 | slightly bright | green |
| 0.98 | bright | yellowish green |
| 1.15 | bright | reddish orange |
| 1.30 | slightly dark | reddish purple |
| 1.45 | dark | bluish green |

The measured results of the time-multiplexed drive characteristics of the liquid crystal cell having the optical path difference Δn·d of 0.98 μm are summarized in Table 3 according to the liquid crystal device of the present invention. The sharpness of luminance-voltage characteristic, γ, the viewing-angle dependence Δφ and the time-multiplexability m are greatly improved.

TABLE 3

| | |
|---|---|
| γ | 1.033 |
| Δφ | 0.988 |
| m | 0.956 |

Figure 8:
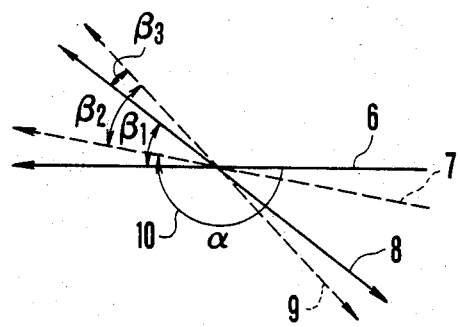
FIG. 8 is a representation for explaining the relationship among the major axes of the liquid crystal molecules, the twist angle and the axes of the polarizers of a liquid crystal display device according to another embodiment of the present invention.

In FIG. 6, the absorption axes of the polarizing plates can be arranged in place of the polarizing axis to obtain the same effect. In the above embodiment, a liquid crystal mixture of biphenyl and ECH liquid crystals is used. However, any other nematic liquid crystal having the positive dielectric anisotropy may be used to obtain the same effect as in the above embodiment. The twist direction of the helical structure is the counterclockwise direction in the above embodiment. However, as shown in FIG. 8, the twist direction may be the clockwise direction to obtain the same effect as in the above embodiment.

The type of chiral material is not particularly limited to the above chiral material when the relationships between the rubbing directions and the twist directions shown in FIGS. 4, 6 and 7 are held.

According to the present invention as described above, unlike the conventional liquid crystal display device, a liquid crystal display device having the excellent time-multiplexed drive characteristics and high quality dispaly characteristics is obtained.

What is claimed is:

1. A liquid crystal display device wherein a nematic liquid crystal having a positive dielectric anisotropy and with a chiral material added is sealed between a pair of upper and lower substrates so as to constitute a helical structure twisted within a range between 160° and 200° along a direction of thickness thereof, and polarizing axes or absorption axes of a pair of polarizing plates disposed on said upper and lower substrates are inclined by a predetermined angle with respect to major axes of liquid crystal molecules adjacent to said upper and lower substrates, respectively, whereby light scattering near threshold voltage is avoided and time-multiplexed contrast is increased.

2. A device according to claim 1, wherein said polarizing axes or said absorption axes of said pair of polarizing plates constitute an included angle falling within a range from 0° to 30°.

3. A device according to claim 1, wherein said absorption axis or said polarizing axis of each of said polarizing plates and a direction of a corresponding one of said major axes of the liquid crystal molecules adjacent to said upper and lower substrates constitute an included angle falling within a range from 30° to 60°.

4. A device according to claim 1, wherein a product Δn·d of a thickness d (μm) of a liquid crystal layer and an optical anisotropy Δn falls within a range from 0.7 μm to 1.2 μm.

* * * * *